Dec. 25, 1956  F. E. BROWN  2,775,476
SELF-TIGHTENING AND GRIPPING BATTERY LIFTER
Filed Aug. 10, 1953
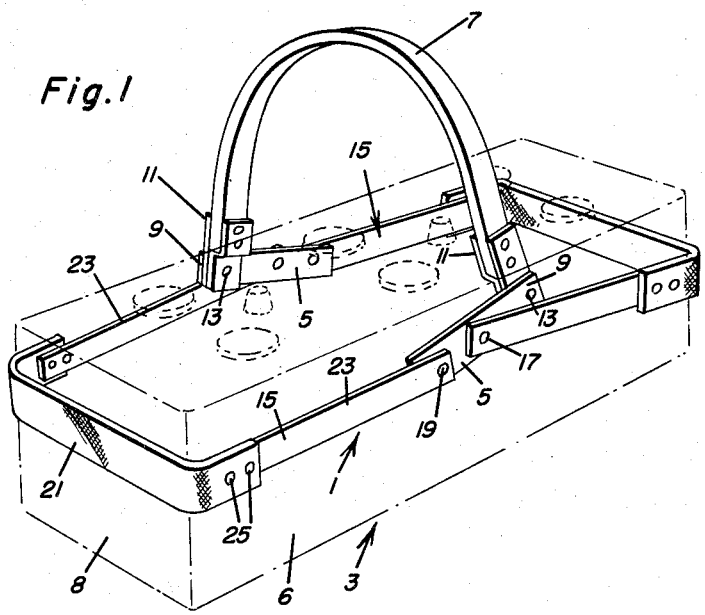
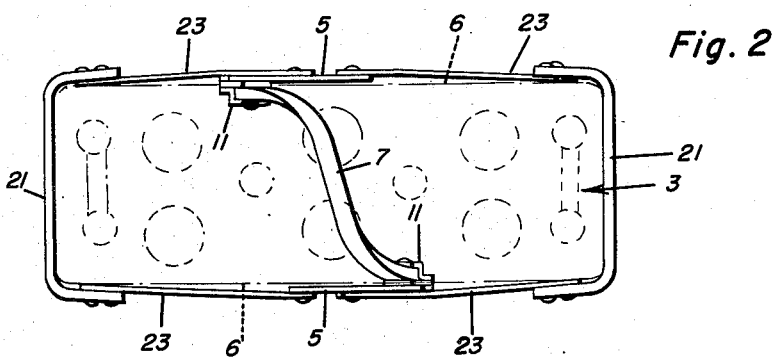
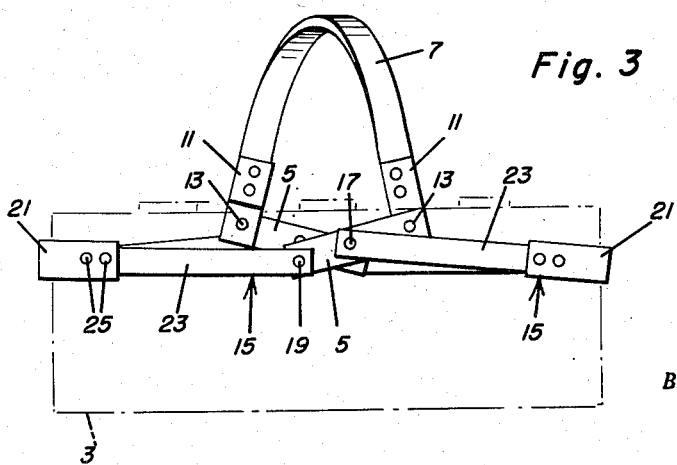
Felix E. Brown
INVENTOR.

United States Patent Office 2,775,476
Patented Dec. 25, 1956

2,775,476

SELF-TIGHTENING AND GRIPPING BATTERY LIFTER

Felix E. Brown, Bethlehem, Pa.; Union Bank & Trust Company of Bethlehem, administrator of said Felix E. Brown, deceased, assignor to East Penn Manufacturing Co., Inc.

Application August 10, 1953, Serial No. 373,198

2 Claims. (Cl. 294—29)

My invention relates to improvements in battery lifters of the self-tightening and gripping type.

The primary object of the invention is to provide a lifter for the extra long, rectangular, and unusually cumbersome automobile batteries of commerce, and which grips such batteries at both ends and at the sides thereof and tightens its grip under the weight of the battery to positively prevent the lifter from slipping off the battery and the battery from being dropped.

Another object is to provide a lifter for the above purposes which is adapted for carrying the battery in a self-balancing position so as to prevent acid from being spilled from the battery.

Still another object is to provide a lifter for the above purposes which is absolutely safe, foolproof, and inexpensive to manufacture.

Other and subordinate objects within the purview of my invention, together with the precise nature of my improvements will become readily apparent when the succeeding description and claims are read with reference to the drawing accompanying and forming part of this specification.

In said drawing:

Figure 1 is a view in perspective of my improved battery lifter applied to a battery shown in broken lines;

Figure 2 is a view in plan of the same; and

Figure 3 is a view in side elevation.

Referring to the drawing by numerals, my improved battery lifter as shown therein comprises a handle equipped battery gripping harness 1 adapted to surround the conventional elongated automobile battery shown at 3 in broken lines.

The battery harness comprises a pair of vertically swingable, flat, center side levers 5 adapted to be opposed flatwise in opposite relation to opposite sides 6 of the battery 3.

A strap handle 7, of any suitable flexible material, and which is adapted to extend over and across the battery 3 has its opposite ends pivoted to and connected to relatively opposite operating ends 9 of the levers 5 by terminal clips 11 on the handle 7 and rivets 13 pivotally connecting said clips to said ends 9, the arrangement being such that the levers 5 are swung vertically and oppositely with respect to each other when lifting force is imparted to the handle 7.

The harness 1 further includes a pair of U-shaped grips 15 adapted to straddle opposite ends 8 of the battery 3 and to extend along the sides 6 thereof. Each grip 15 has one end pivoted, as at 17, to an intermediate portion of one lever 5 and its other end pivoted, as at 19, to the end of the other lever 5 remote from its operating end 9. The grips 15 each include a flexible bight portion 21 of heavy canvas or other friction gripping material adapted to extend around the adjacent end 8 of the battery 3 and for a considerable distance along the sides 6 of the battery, and flat side bars 23 riveted to the bight portion 21, as at 25.

The handle 7 because of its described connection to relatively opposite operating ends 9 of the pair of opposite levers 5 extends diagonally over the battery 3 with its ends at opposite sides of the transverse center of said battery.

Referring now to the operation of the described lifter, when lifting force is applied to the handle 7, the levers 5 are swung vertically in opposite directions with respect to each other toward vertical position thereby, through the pivots 17, 19 of the grips 15 pulling said grips 15 toward each other to cause the bight portions 21 to tightly grip the ends 8, the vertical corners, and the sides 6 of the battery 3. Thus the battery 3 is tightly gripped at both its ends and at its sides by my improved lifter and the heavier the battery the tighter the gripping action of the lifter at the specified points. Of course, since the handle 7 is pivoted to the levers 5 with its ends at the opposite sides of the transverse center of the battery 3, the battery under its own weight is self-balancing.

It will be noted that the pivots 13, 17, 19 are aligned in the levers 5 so that when the levers 5 are swung toward vertical position the pivoted ends of the grips 15 are separated vertically and will not abut each other and thereby limit movement of said grips toward each other. This provides for increasing the range of usefulness of the lifter on smaller sizes of batteries.

The foregoing will, it is believed, suffice to impart a clear understanding of my invention, without further explanation.

Manifestly, the invention, as described, is susceptible of modification without departing from the inventive concept and right is herein reserved to such modifications as fall within the scope of the invention as disclosed herein.

What is claimed as new is as follows:

1. A battery lifter comprising a pair of vertically swingable levers adapted to be opposed to opposite sides of the battery and having relatively opposite operating ends, a flexible handle adapted to extend across and over the battery and pivoted to and connecting said operating ends to swing said levers vertically and oppositely with respect to each other when lifting force is applied to said handle, and a pair of U-shaped grips adapted to straddle opposite ends of the battery and to extend along the sides thereof, said grips each having one end pivoted to an intermediate portion of one of said levers and its other end pivoted to the end of the other lever remote from the operating end of said other lever whereby said grips will be pulled toward each other into tight engagement with the ends of the battery upon vertical swinging of said levers oppositely with respect to each other, the pivots of said handle and of said ends being in alignment on said levers whereby when said levers are swung toward vertical position the ends of the grips will be separated vertically to prevent the same from abutting and limiting pulling of the grips toward each other.

2. A battery lifter according to claim 1, said handle extending over said grips diagonally with its ends pivoted to said levers upon opposite sides of the lifter and spaced longitudinally of the lifter from opposite sides of the transverse center of the lifter whereby said battery is self-balancing when lifted.

References Cited in the file of this patent

UNITED STATES PATENTS

| 1,231,642 | Parent | July 3, 1917 |
| 1,366,763 | Berry | Jan. 25, 1921 |
| 1,803,755 | Goez | May 5, 1931 |

FOREIGN PATENTS

| 144,264 | Switzerland | Mar. 2, 1931 |